No. 861,693. PATENTED JULY 30, 1907.
C. ANTOONOVICH.
APPARATUS FOR PYRITIC SMELTING.
APPLICATION FILED APR. 21, 1902.

2 SHEETS—SHEET 1.

Attest:
Ewd L. Tolson.
B. Phillips.

Inventor,
Christopher Antoonovich
By Richards &Co
Attys.

No. 861,693. PATENTED JULY 30, 1907.
C. ANTOONOVICH.
APPARATUS FOR PYRITIC SMELTING.
APPLICATION FILED APR. 21, 1902.

2 SHEETS—SHEET 2.

Attest:
Edwd L. Tolson.
B. Phillips.

Inventor,
Christopher Antoonovich
By Richards & Co.
Attys

UNITED STATES PATENT OFFICE.

CHRISTOPHER ANTOONOVICH, OF ST. PETERSBURG, RUSSIA.

APPARATUS FOR PYRITIC SMELTING.

No. 861,693.  Specification of Letters Patent.  Patented July 30, 1907.

Application filed April 21, 1902. Serial No. 104,026.

*To all whom it may concern:*

Be it known that I, CHRISTOPHER ANTOONOVICH, a subject of the Emperor of Russia, and a resident of St. Petersburg, Russia, (Moïka 61,) have invented certain new and useful Improvements in Metallurgical Apparatus for Pyritic Smelting, of which the following is a specification.

The invention has for its object to utilize in a most advantageous way the heating power of iron, sulfur and other elements of ore by means of a new combination of the following apparatuses; a converter, a reverberatory furnace and a regenerator or a recuperator.

Figure 1:
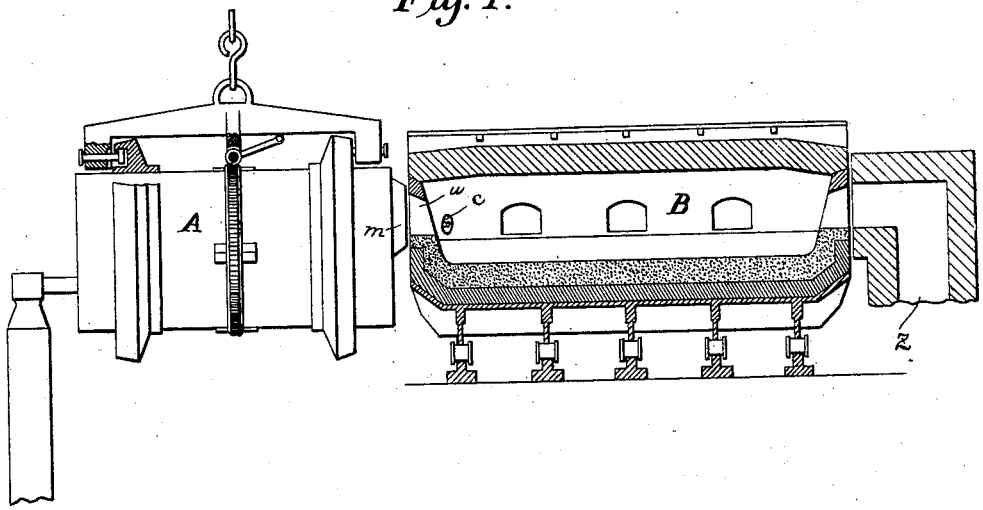
Figure 2:
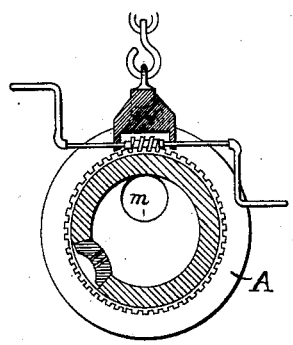
Figure 3:
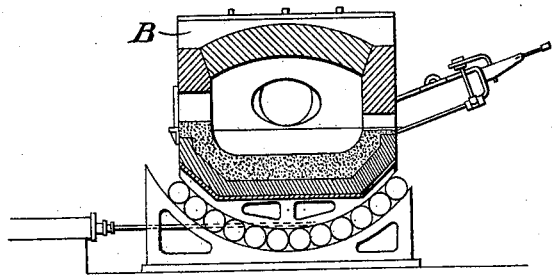
Figure 4:
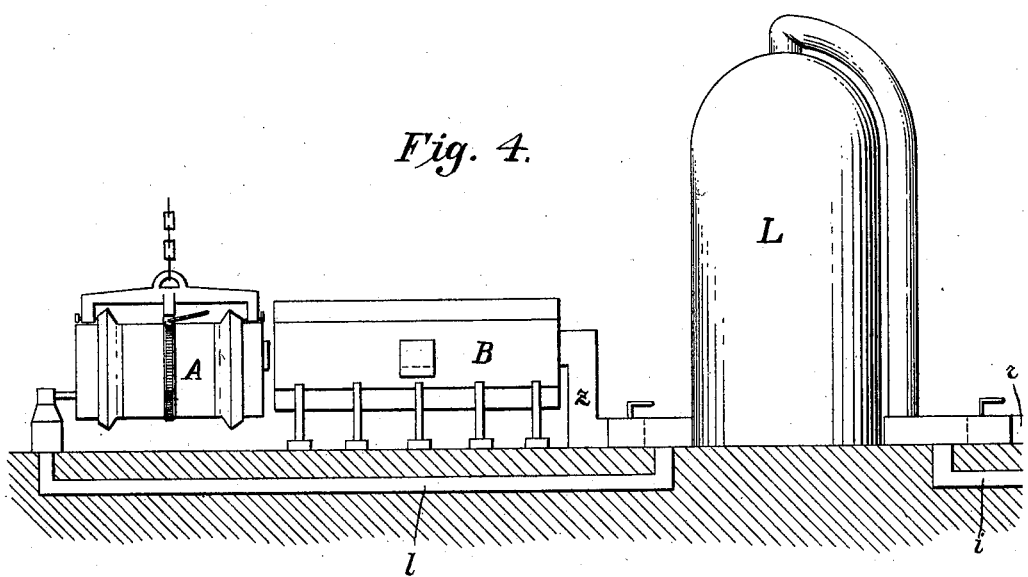
Figure 5:
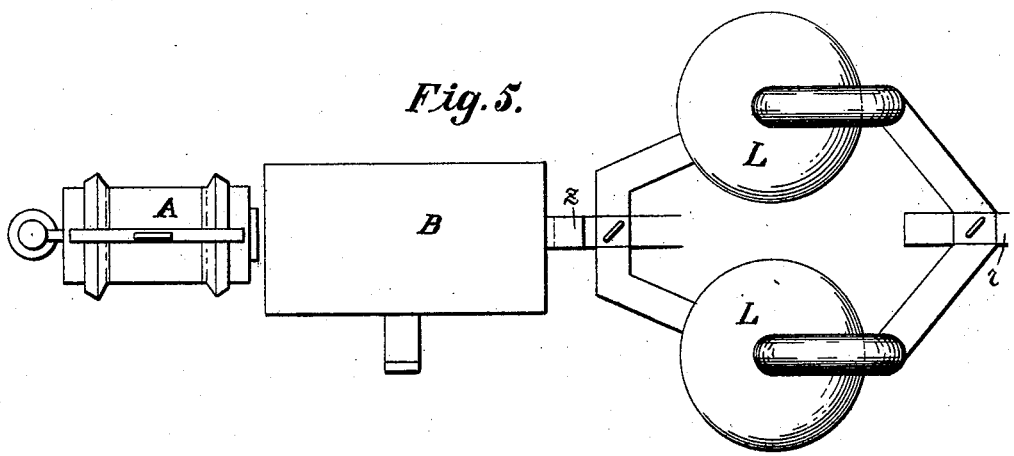

In the accompanying drawings:—Figure 1 shows the converter and the reverberatory furnace; Fig. 2 shows a cross section of the converter, Fig. 3—a cross section of the reverberatory furnace; Fig. 4 is a side view of the whole combination, and Fig. 5 is a plan of it.

In the drawing A is the converter, B the reverberatory furnace, L, L are two regenerators, $z$ the conduit of waste gases connecting the reverberatory furnace with the regenerators, $i$ the conduit of waste products connecting the regenerators with the chimney, $r$ the conduit of cold air connecting the blowing engine with the regenerators, I the conduit of heated air connecting the regenerators with the converter, $c$ the pipe which supplies the reverberatory furnace with additional liquid or gaseous fuel.

The converter is movable: in one position it communicates by its opening $m$ with the opening $u$ of the reverberatory furnace and gases from it enter the latter, in another position it takes the matte from the reverberatory furnace, being brought in front of the furnace beneath the tap hole therein.

The regenerators by conduits supplied with reversible valves are connected:—1—with the reverberatory furnace—to take in the gases, 2—with the engine,—to take in the blast and 3—with the converter—to send the heated air thereto.

The reverberatory furnace smelts the ore; the slag is carried away, the matte is poured into the converter. The blowing of the air through the converter gives the hot gases which entering into the reverberatory furnace smelt the ore. The gases from the reverberatory furnace, by means of the regenerators, heat the air for the converter. The matte in the converter is concentrated into a richer matte or into a coarse copper.

I claim as my invention

1. An apparatus for smelting ore, comprising a reverberatory furnace, having a gas inlet therein, a movable converter adapted while in one position, to receive the matte from the said reverberatory furnace and in another position to be connected with the gas inlet in said furnace and means for passing hot air through said converter while it is connected with said gas inlet so that the air and gases from the converter will pass into the furnace.

2. An apparatus for smelting ore, comprising a reverberatory furnace having a gas inlet and a gas outlet, a movable converter adapted while in one position to receive matte from the said reverberatory furnace, and in another position to be connected with the gas inlet in said furnace and regenerators having conduits for waste gases and air, said waste gas conduits being connected with the gas outlet of the reverberatory furnace and the air conduits being connected with the converter.

In witness whereof I have hereunto set my hand in presence of two witnesses.

CHRISTOPHER ANTOONOVICH.

Witnesses:
N. TSCHEKALOFF,
Z. BLAU.